Patented Apr. 2, 1929.

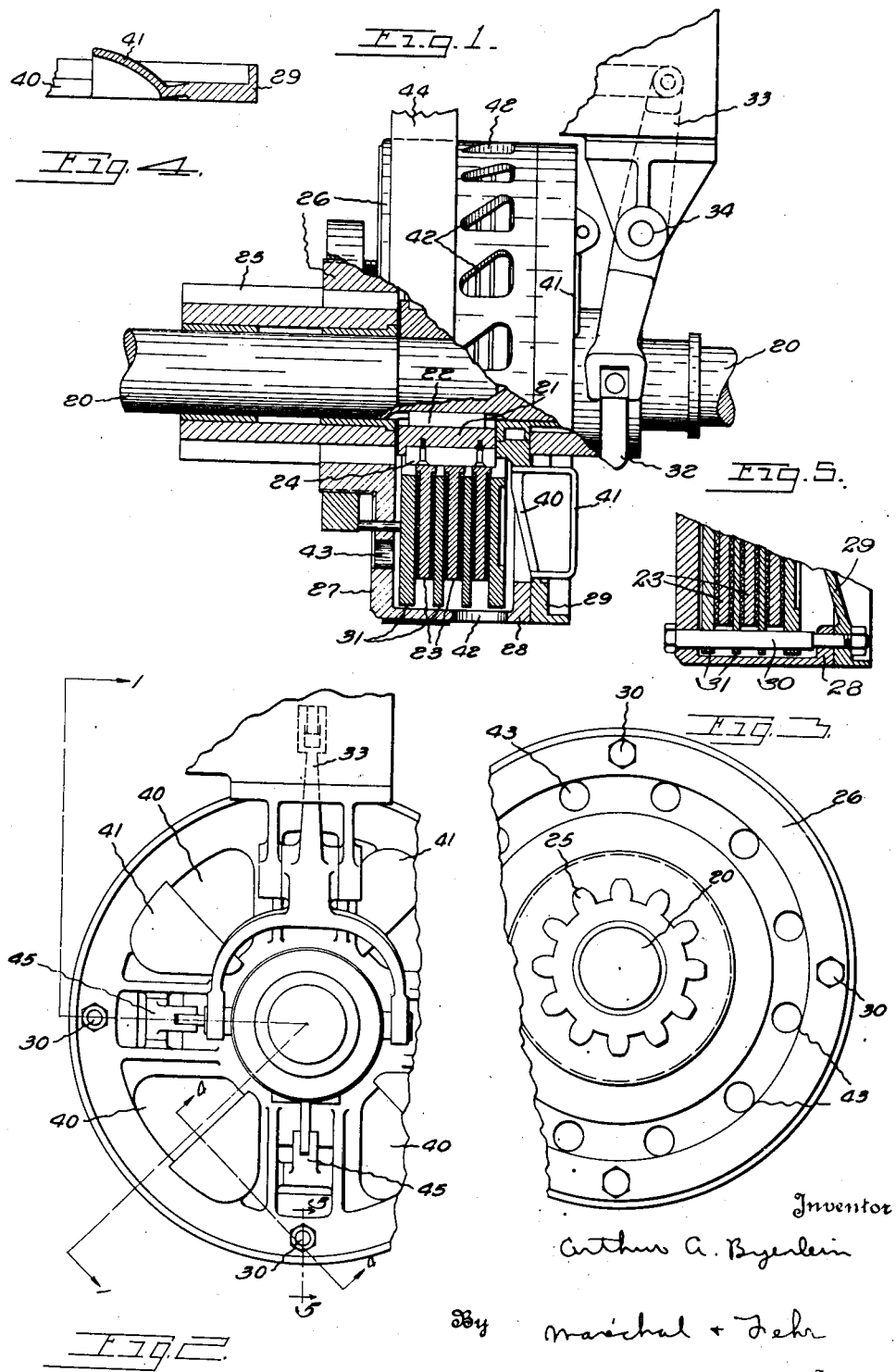

1,707,843

UNITED STATES PATENT OFFICE.

ARTHUR A. BYERLEIN, OF DETROIT, MICHIGAN, ASSIGNOR TO THE HAMILTON PRESS & MACHINERY COMPANY, OF HAMILTON, OHIO, A CORPORATION OF OHIO.

CLUTCH.

Application filed June 16, 1924. Serial No. 720,325.

The present invention relates to clutches, and more particularly to clutches of large size adapted for use in heavy machinery.

One of the principal objects of the invention is to provide such a clutch having provisions for ventilating the interior thereof.

Further objects of the invention will be apparent from the following description taken in connection with the accompanying drawings, in which:

Fig. 1 is a side elevation of the clutch partly in section on the line 1—1 of Fig. 2;

Fig. 2 is a front elevational view of the clutch;

Fig. 3 is a rear elevational view of the clutch;

Fig. 4 is a detail sectional view taken on the line 4—4 of Fig. 2; and

Fig. 5 is a detailed sectional view taken on the line 5—5 of Fig. 2.

In the use of large friction disc clutches in connection with heavy machinery, such for example as drawing presses adapted for working sheet metal to form automobile bodies, wherein the clutch is operated frequently at more or less regular intervals, it has been found that a great deal of heat is produced which is difficult to dissipate owing to the large mass and the compactness of the clutch parts. The present invention contemplates a clutch wherein the excessive heat may be effectively dissipated by means of suitable air ventilating passages and deflectors formed in the clutch casing.

Referring to the drawings, 20 designates a driving shaft having a collar 21 immovably secured thereon by means of a key 22. A set of frictional disc clutch elements or plates 23 is slidably but non-rotatably secured to the collar 21 by means of a keyed connection consisting of keys 24 secured to the collar and cooperating slots formed in the disc clutch elements 23.

Adjacent the collar 21 and rotatably mounted upon the driving shaft 20 is a driven gear 25 to one end of which is secured the clutch casing or drum 26. The clutch casing consists of a rear end wall portion 27 a cylinder or drum wall portion 28 and the front end wall or cover portion 29, which together form a housing for enclosing the disc clutch elements and the collar 21. The cover portion 29 is held to the main body of the clutch casing 26 by means of bolts 30 which also pass through suitable openings or slots in the outer set of frictional disc clutch elements 31 to connect the latter non-rotatably but slidably with the clutch casing 26.

The driven pinion 25 may be clutched to the driving shaft 20 by compressing the frictional disc clutch elements 23 and 31, and it may be unclutched by relieving the pressure on these disc clutch elements. The clutching and unclutching operation is effected by means of suitable actuating mechanisms or toggles 45 which are connected between the cover member 29 and the disc clutch elements. As shown in Fig. 2 the actuating mechanisms or toggles 45 are circumferentially disposed about the cover plate 29 and are adapted to be actuated from a common reciprocable sleeve 32 which may be controlled by lever 33 pivoted on a suitable bracket at 34. The construction of the clutch is more fully described and claimed in a copending application, and further detailed description thereof is therefore not deemed necessary in the present application.

Ventilation of the clutch casing 26 is effected by means of air inlet passages 40 formed in the cover plate 29 intermediate the actuating or toggle mechanisms 45. Adjacent each air inlet passage 40 is a cup-shaped deflector or ventilating blade 41 which in the present instance is integral with the cover 29 and which is inclined against the direction of rotation of the clutch casing whereby upon rotation of the clutch casing air is forced through the air inlet passages 40 to the interior of the clutch casing. As shown in Figs. 1 and 3 the clutch casing is provided with a circumferential series of air outlet passages 42 in its cylindrical or peripheral wall portion, and with a circumferential series of air outlet passages 43 in the rear wall of the casing. As shown in Fig. 1 a considerable portion of the cylindrical wall portion of the casing is utilized as a brake drum to receive a brake band 44, whereby after the punch press has been operated, the driven pinion 25 and the connected parts may be quickly brought to rest.

In the operation of the clutch heat is produced both by the frictional disc clutch elements during clutching, and by the brake band 44 during the braking operation, but excess heat is effectively dissipated by the ventilating means herein described, wherein the cup shaped deflectors 41 cause the air to pass over the disc clutch elements and the interior surface of the clutch casing to cool the same, the heated air being discharged through the air passages 42 and 43.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

In a device of the character described, a revoluble clutch casing having peripheral and end walls, a series of driving disk clutch elements and a series of driven disk clutch elements therein, said casing having air inlet openings formed in one end wall thereof of a width radially commensurate with the radial extent of the clutch elements, air outlet openings formed in the other end wall thereof and air outlet openings formed in the peripheral wall thereof, and deflecting means for deflecting air into said air inlet openings, said clutch elements being so disposed within the clutch casing as to permit the flow of air over the clutch elements from said inlet openings to the outlet openings.

In testimony whereof I hereto affix my signature.

ARTHUR A. BYERLEIN.